(12) United States Patent  
Mackelden et al.

(10) Patent No.: US 7,321,478 B2
(45) Date of Patent: Jan. 22, 2008

(54) DATA TRANSFER APPARATUS HEAD CLEANING

(75) Inventors: John Mark Mackelden, Bristol (GB); Nigel Ronald Evans, Bristol (GB); Andrew Malcolm George Clarke, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/359,500

(22) Filed: Feb. 23, 2006

(65) Prior Publication Data

US 2006/0238911 A1 Oct. 26, 2006

(30) Foreign Application Priority Data

Apr. 21, 2005 (GB) ............................ 0508026.2

(51) Int. Cl.
   *G11B 19/02* (2006.01)
   *G11B 27/36* (2006.01)
(52) U.S. Cl. .................................. 360/69; 360/31
(58) Field of Classification Search ..................... None
   See application file for complete search history.

(56) References Cited

U.S. PATENT DOCUMENTS

| 5,253,126 A | 10/1993 | Richmond |
| 5,287,478 A * | 2/1994 | Johnston et al. ............. 711/111 |
| 5,495,371 A * | 2/1996 | Munemoto et al. ........... 360/71 |
| 5,684,766 A | 11/1997 | Inoue et al. |
| 6,401,214 B1* | 6/2002 | Li .................................. 714/6 |
| 6,417,977 B1* | 7/2002 | Ohta et al. .................... 360/31 |
| 6,624,958 B1* | 9/2003 | Alva ........................... 360/53 |
| 6,654,194 B1 | 11/2003 | Masuda et al. |
| 6,775,086 B1* | 8/2004 | Kobayashi et al. ........ 360/74.1 |
| 2002/0085302 A1 | 7/2002 | Masuda et al. |

FOREIGN PATENT DOCUMENTS

| GB | 2 367 563 A | 4/2002 |
| JP | 3 17812 A | 1/1991 |

\* cited by examiner

*Primary Examiner*—K. Wong

(57) ABSTRACT

A data transfer apparatus is described for transferring data between at least one transducer head of the data transfer apparatus and a data medium removably received in the data transfer apparatus. The data transfer apparatus is operable to monitor at least one data transfer performance characteristic, and to use results of the monitoring to set an indicator for access by the data transfer apparatus, for use in connection with a subsequent head-cleaning process using a designated head-cleaning medium, the indicator corresponding to an appropriate quality of head-cleaning process.

14 Claims, 6 Drawing Sheets

DATA TRANSFER APPARATUS HEAD CLEANING

CLAIM TO PRIORITY

The present application claims priority to copending United Kingdom utility application entitled, "DATA TRANSFER APPARATUS HEAD CLEANING," having serial no. GB 0508026.2, filed Apr. 21, 2005, the disclosure of which is incorporated herein by reference in its entirety.

FIELD OF THE INVENTION

The present invention relates to facilitating cleaning of one or more heads of a data transfer apparatus.

BACKGROUND OF THE INVENTION

A known form of storage medium for use in storing computer data takes the form of a magnetically writable and/or recordable tape that is moved relative to magnetic transducer (read and/or write) heads for transferring data between the apparatus and the tape. One form of magnetic tape data transfer apparatus is a tape drive that comprises a rotary-scan tape deck in which the tape from a tape cartridge passes at a predetermined angle across a rotary head drum. In operation the tape is drawn from a supply reel to a take-up reel by rotation of a capstan against which the tape is pressed by a pinch roller. The head drum houses two write heads angularly spaced by 180° and two read heads also angularly spaced by 180°.

The magnetic tape is subject to wear and deterioration and the data transfer apparatus is subject to head clogs. The result is that errors occur in the read/write process. Whilst some errors can be detected and/or corrected by a format of data encoding that includes error control within the format definition, nevertheless it is necessary to take steps to clean the transducer heads so that errors that are attributable to dirty heads are eliminated or reduced.

It is already known to clean the magnetic transducer heads by inserting a cleaning tape cartridge into such a magnetic data transfer apparatus. The cleaning tape cartridge contains a cleaning tape that has no written data but is pulled through the data transfer apparatus to clean the heads. The cleaning tape is advanced by a chosen increment to clean the heads. The increment of cleaning tape that is pulled through the data transfer apparatus is contaminated by the cleaning process and is not re-used. A fresh increment of the cleaning tape is advanced when a cleaning operation is performed the next time.

A disadvantage of known methods of cleaning the heads of the data transfer apparatus by a cleaning tape is that, in a situation where an unsatisfactory cleaning operation has resulted, it can be unclear to a field user that the heads are still in an unsatisfactory state, and/or whether a further clean, perhaps with different cleaning parameter values, is advisable and likely to further improve the error rate. Field users of the data transfer apparatus also sometimes do not accurately follow instructions for carrying out cleaning of the transducer heads, which can result in unnecessary reporting of faults that can be remedied merely by cleaning the heads. Furthermore, where field users do carry out predetermined cleaning routines for remedying poor data transfer performance, these routines might not be entirely appropriate for the situation. For example, predetermined cleaning routines can be unnecessarily extensive, resulting in wastage of or undue wear to the cleaning tape.

It is an object of the invention to mitigate or overcome at least one of the above-mentioned problems.

SUMMARY OF THE INVENTION

According to the present invention, there is provided data transfer apparatus for transferring data between at least one transducer head of the data transfer apparatus and a data medium removably received in the data transfer apparatus, the data transfer apparatus being operable to:
  a. monitor at least one data transfer performance characteristic; and
  b. use results of the monitoring to set an indicator for access by the data transfer apparatus for use in connection with a subsequent head-cleaning process using a designated head-cleaning medium, the indicator corresponding to an appropriate quality of head-cleaning process.

Further, according to the present invention, there is provided a method of operating data transfer apparatus, the method comprising:
  a. monitoring at least one data transfer performance characteristic during data transfer operations, in normal use, between the data transfer apparatus and a data medium removably received in the data transfer apparatus; and
  b. using results of the monitoring to set an indicator corresponding to an appropriate quality of head-cleaning process.

DESCRIPTION OF THE DRAWINGS

The invention will now be described, by way of example only, with reference to the accompanying drawings in which.

DETAILED DESCRIPTION

Figure 1:
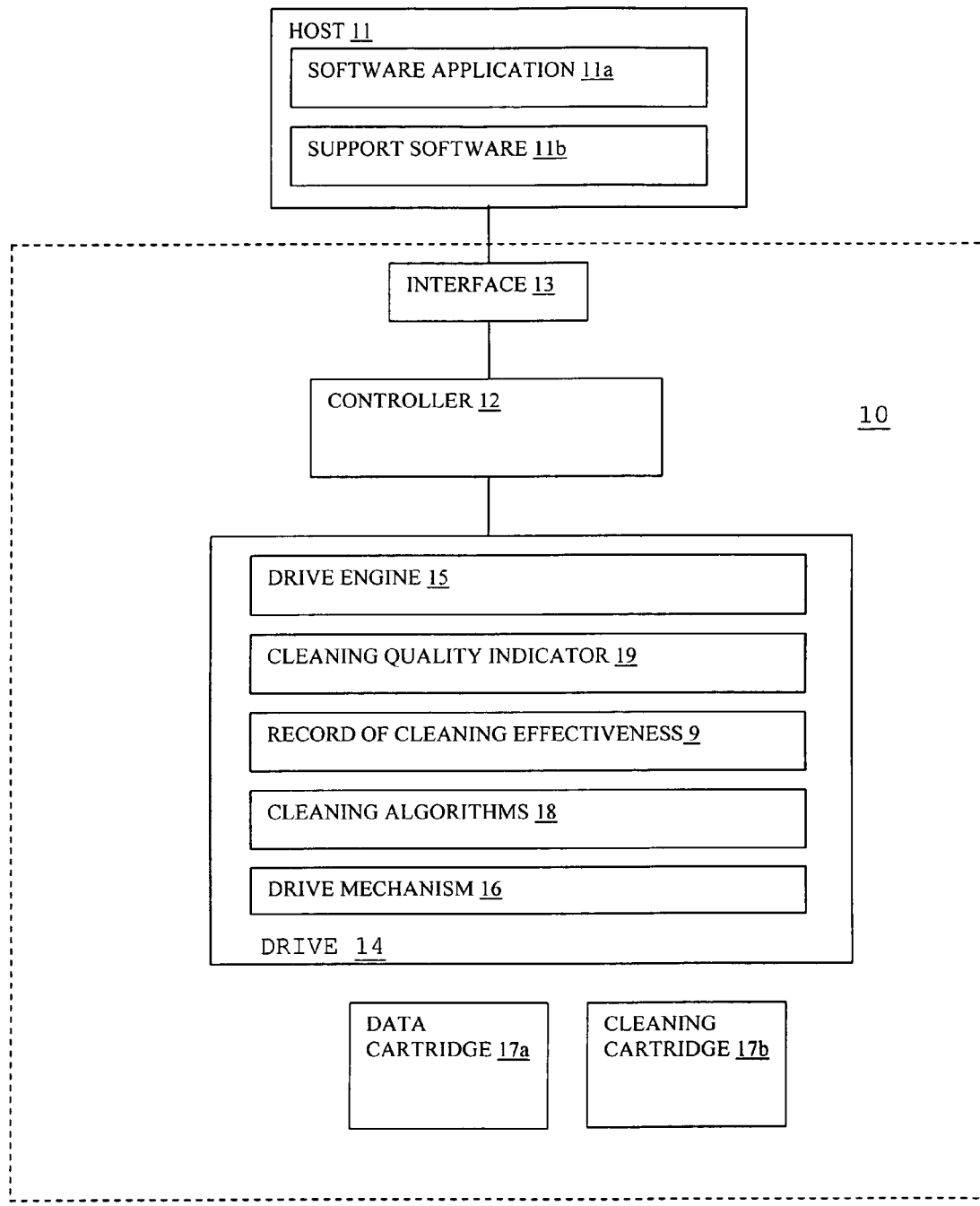
FIG. 1 is a block diagram of components of a system including a magnetic tape data transfer apparatus.

Referring to FIG. 1, there is shown a data storage system 10. The system includes a host computer, or host, 11 coupled to a controller 12 via an interface 13. The controller 12 is programmed to control a data transfer apparatus in the form of a tape drive 14 that includes a drive engine 15 and a drive mechanism 16. The drive mechanism is adapted to receive a data medium in the form of a tape data cartridge 17*a*.

The tape cartridge 17*a*, in normal use of the tape drive 14 for purposes of reading and writing data, is a magnetic tape data cartridge 17*a*, containing tape (not shown) optimised for receiving and storing data. A controlling software application 11a on the host 11 controls the reading and writing of data to and from the magnetic data tape medium in the tape data cartridge 17a.

The host system 11 has at least one central processing unit (CPU) and a memory to store the controlling software application 11a. The interface 13 connecting the host system 11 to the controller 12 can, for example, be any suitable proprietary standard bus.

The drive mechanism 16 includes electrical and mechanical components that receive, position and access tape cartridges. The drive mechanism has components to lock a tape cartridge 17a, 17b in place, an ejection motor and transducer heads (not shown).

For purposes of cleaning the transducer heads of the tape drive 14, the drive mechanism is also adapted to receive a head-cleaning medium in the form of a designated, dedicated cleaning tape cartridge 17b, containing head-cleaning tape that is particularly suitable for cleaning purposes. For example, the head-cleaning tape can have increased abrasivity. Generally, the quality of data transfer between the transducer heads and the cleaning cartridge 17b tape is impaired compared to the quality of data transfer between the transducer heads and the data cartridge 17a tape.

Figure 2:
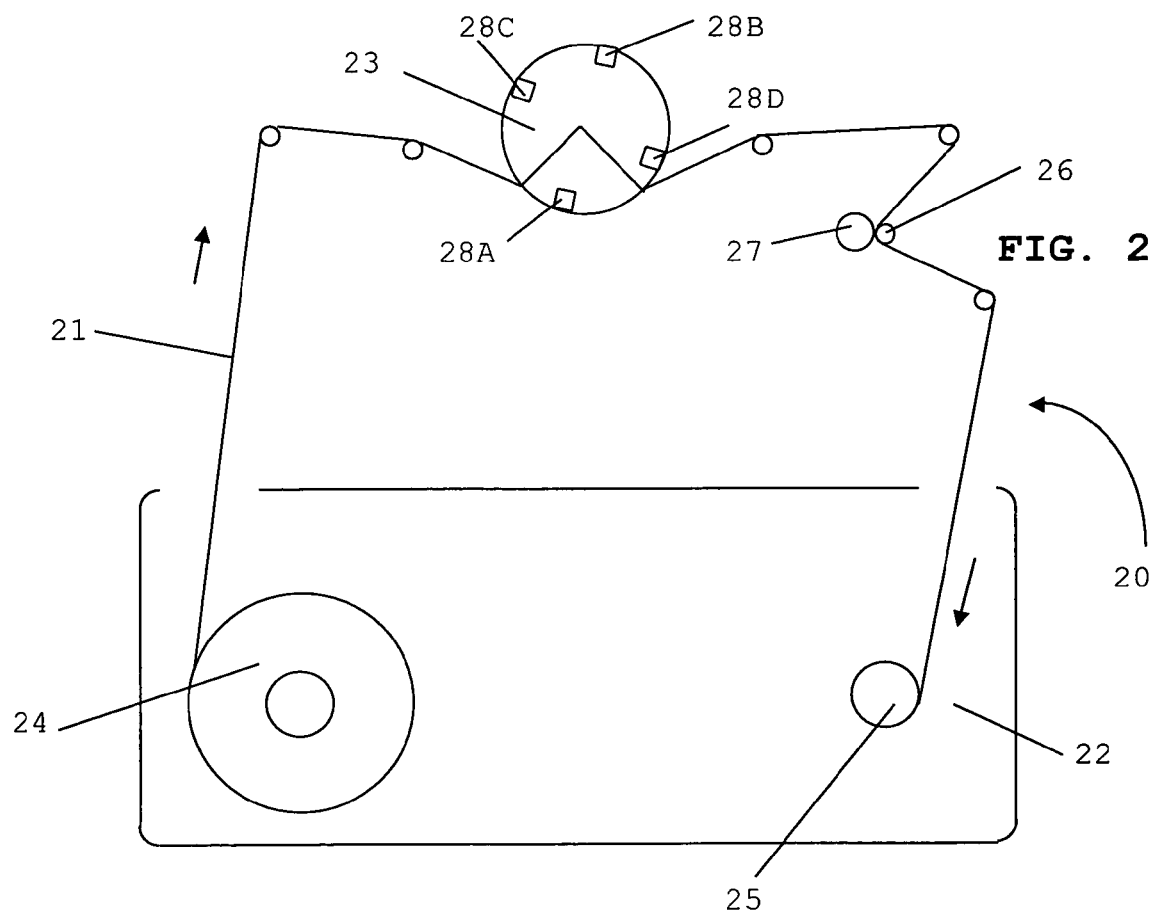
FIG. 2 shows the main physical components of a tape deck included in the system of FIG. 1.
Figure 3:
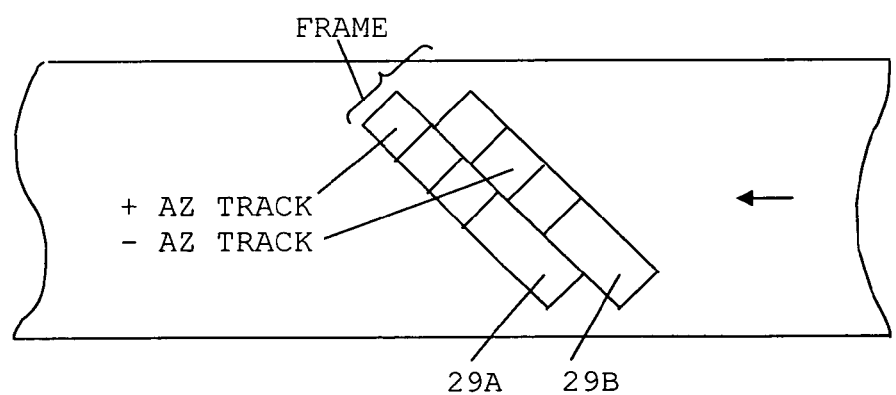
FIG. 3 is a diagrammatic representation of two data tracks written on a tape by means of the tape deck of FIG. 2.

Referring to FIG. 2, there is shown the basic layout of the tape drive 14 which is in the form of a helical-scan tape deck 20 in which tape 21 from a tape cartridge 22 passes at an angle across a rotary head drum 23. The tape is driven in the direction indicated by the arrows from a motor driven supply reel 24 to a motor driven take up reel 25. A capstan 26 and pinch roller 27 control the passage of the tape past the head drum 23. The rotary head drum 23 carries two magnetic write heads 28A and 28B spaced apart by 180° and two magnetic read heads 28C and 28D also spaced apart by 180°. The heads 28A and 28B are arranged to write a succession of overlapping oblique data tracks 30, 31 on the tape as shown in FIG. 3. The two tracks 30, 31 are representative of a succession of tracks along the tape that are written in a manner well known in the art. The track written by the head 28A has a positive azimuth while the track written by the head 28B has a negative azimuth. Each pair of positive and negative azimuth tracks 29A, 29B constitutes a frame.

Whilst the tape drive 14 is exemplified as of the helical-scan type, it will be apparent that any other suitable type of tape drive can be employed with the invention, for example a linear type of tape drive as used, for example, in the well known Linear Tape Open (LTO) format.

The drive engine 15 is a data processor that is programmed to supervise the operations of the drive mechanism 16 and to manage the flow of data to be written in or read from a tape data cartridge 17a received in the tape drive 14. The drive engine 15 is programmed to monitor error control performance of the drive 14, and to use the results of this monitoring to calculate and store, for example in volatile memory of the drive 14, an average error rate of data that is written on a tape data cartridge 17a that is loaded in the tape drive 14. For example, to calculate the average error rate the number of errors per 10,000-frame set of data written to and/or read from the data cartridge 17a is stored for each of up to 16 sequential sets of 10,000 frames, and the number of errors per 10,000 frames, averaged over the number of sets, is used as the average error rate. On reaching 16 sets, a window of the most recently transferred 16 sequential sets is maintained as the transducer heads progress relative to the data tape medium, until it is necessary to reset the window and restart the sequence following a discontinuity event such as, for example, a rewind, head reposition or cartridge unload operation by the drive 14. Alternatively, any other convenient type of averaging method can be applied to data from the monitoring.

Average error rates resulting from the monitoring are stored in non-volatile memory accessible to the drive 14 in pairs comprising averages respectively taken i) immediately prior to a clean operation and ii) soon after commencement of transfer of data between the drive 14 and the tape of the next data cartridge 17a received in the drive 14 immediately subsequent to the clean operation. Any convenient number of pairs, for example up to the last ten pairs, are stored in non-volatile memory. These stored pairs of averages provide a record of cleaning effectiveness 9 of the last ten sequential cleans (fewer if the drive has not yet carried out ten cleaning operations).

The drive 14 can be arranged to store the present average error rate to non-volatile memory in response, for example, to a data cartridge unload operation, report of drive error, expiry of a predetermined time period, or any other appropriate event. In response to a cleaning cartridge 17b being recognised in the drive 14, the pre-clean average error rate, based on the last 16 set window or part thereof from the previous data transfer (read and/or write) operations, is stored, or retained, as part of the record of cleaning effectiveness 9. Furthermore, immediately subsequent to a clean, following insertion of a data cartridge 17a in the drive 14 and commencement of data transfer between the drive 14 and the tape of the data cartridge 17a, the drive 14 is arranged to store the post-clean average error rate as part of the record of cleaning effectiveness 9. For example, the post-clean average error can be stored based on a predetermined time period following commencement of data transfer between the drive 14 and the tape of the data cartridge 17a, or following data transfer (reading and/or writing) of a predetermined amount of data (such as 16 data sets) from or to the tape of the data cartridge 17a.

Figure 4:
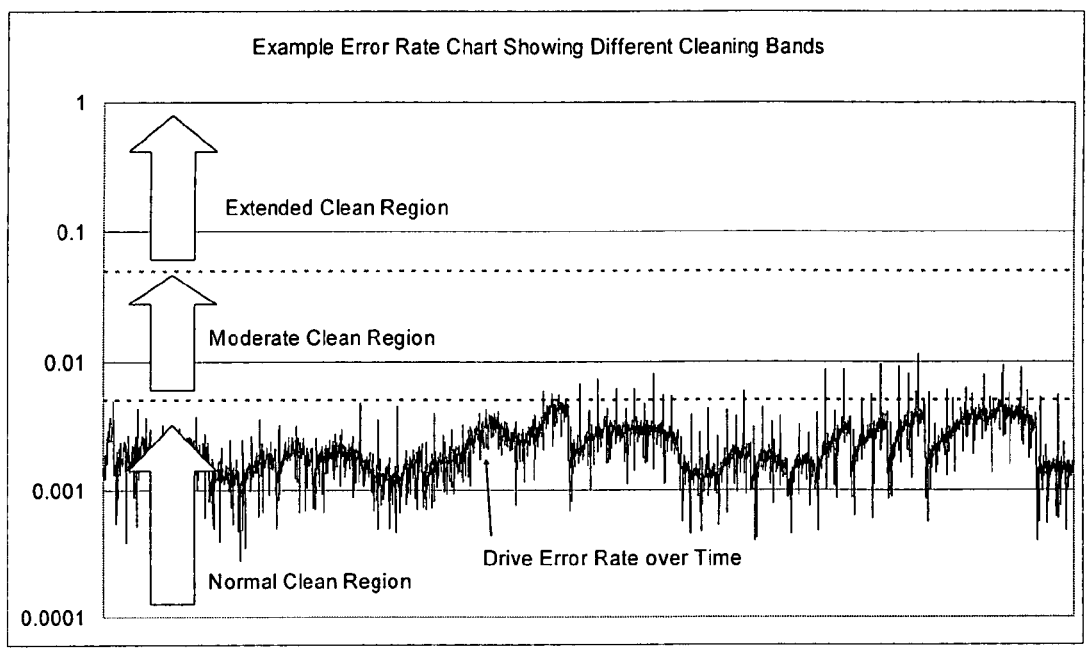
FIG. 4 is a graphical representation showing average error rate (logarithmic scale) against time, and defining three cleaning quality bands, or regions.

FIG. 4 shows a chart of error rate against time. Two thresholds are shown on the vertical (logarithmic) error rate axis, at error rate values of 0.005, and 0.05 errored bits per written bit. The thresholds define transitions between three error rate bands, or regions, corresponding to required head-cleaning processes of different quality. Namely, the band up to and including 0.005 corresponds to standard clean quality, the band above 0.005 up to and including 0.05 corresponds to moderate clean quality, and the band above 0.05 up to and including 1 corresponds to extended clean quality.

Three head-cleaning algorithms 18 are stored in non-volatile memory of the tape drive 14, relating respectively to sequences of operations to be carried out by the drive 14 during standard, moderate and extended quality cleans using a designated cleaning cartridge 17b. For example, the standard clean quality algorithm specifies a 1× cleaning sequence as follows:

X1_FORWARD for 3.1 seconds
X1_REVERSE for 1.8 seconds
X1_FORWARD for 3.5 seconds
X1_REVERSE for 1.8 seconds
X1_FORWARD for 3.5 seconds
STOP
EJECT and the extended clean quality algorithm specifies a 4× cleaning sequence as follows:

```
X1_FORWARD for 3.1 seconds
X1_REVERSE for 1.8 seconds
X1_FORWARD for 3.5 seconds
X1_REVERSE for 1.8 seconds
X1_FORWARD for 3.5 seconds
X1_FORWARD for 3.1 seconds
X1_REVERSE for 1.8 seconds
X1_FORWARD for 3.5 seconds
X1_REVERSE for 1.8 seconds
X1_FORWARD for 3.5 seconds
X1_FORWARD for 3.1 seconds
X1_REVERSE for 1.8 seconds
X1_FORWARD for 3.5 seconds
X1_REVERSE for 1.8 seconds
X1_FORWARD for 3.5 seconds
X1_FORWARD for 3.1 seconds
X1_REVERSE for 1.8 seconds
X1_FORWARD for 3.5 seconds
X1_REVERSE for 1.8 seconds
X1_FORWARD for 3.5 seconds
STOP
EJECT
```

Analogously, the moderate clean quality algorithm specifies a 2× cleaning sequence.

The drive engine 15 is arranged to set a working version of an indicator 19 in memory accessible to the drive 14 with a value according to the error rate band within which the present average error rate falls. The indicator 19 is set, for example, on a periodic basis in the form of a variable, or flag, in volatile memory of the drive 14. The drive engine 15 is also arranged to store the value of the indicator 19 to a location in non-volatile memory accessible to the drive 14 if and when appropriate. For example, the indicator 19 value is stored to non-volatile memory in response to receipt of an unload command by the drive 14, in response to reporting of an error in operation of the drive 14, and/or in response to a periodic update request.

Figure 5:
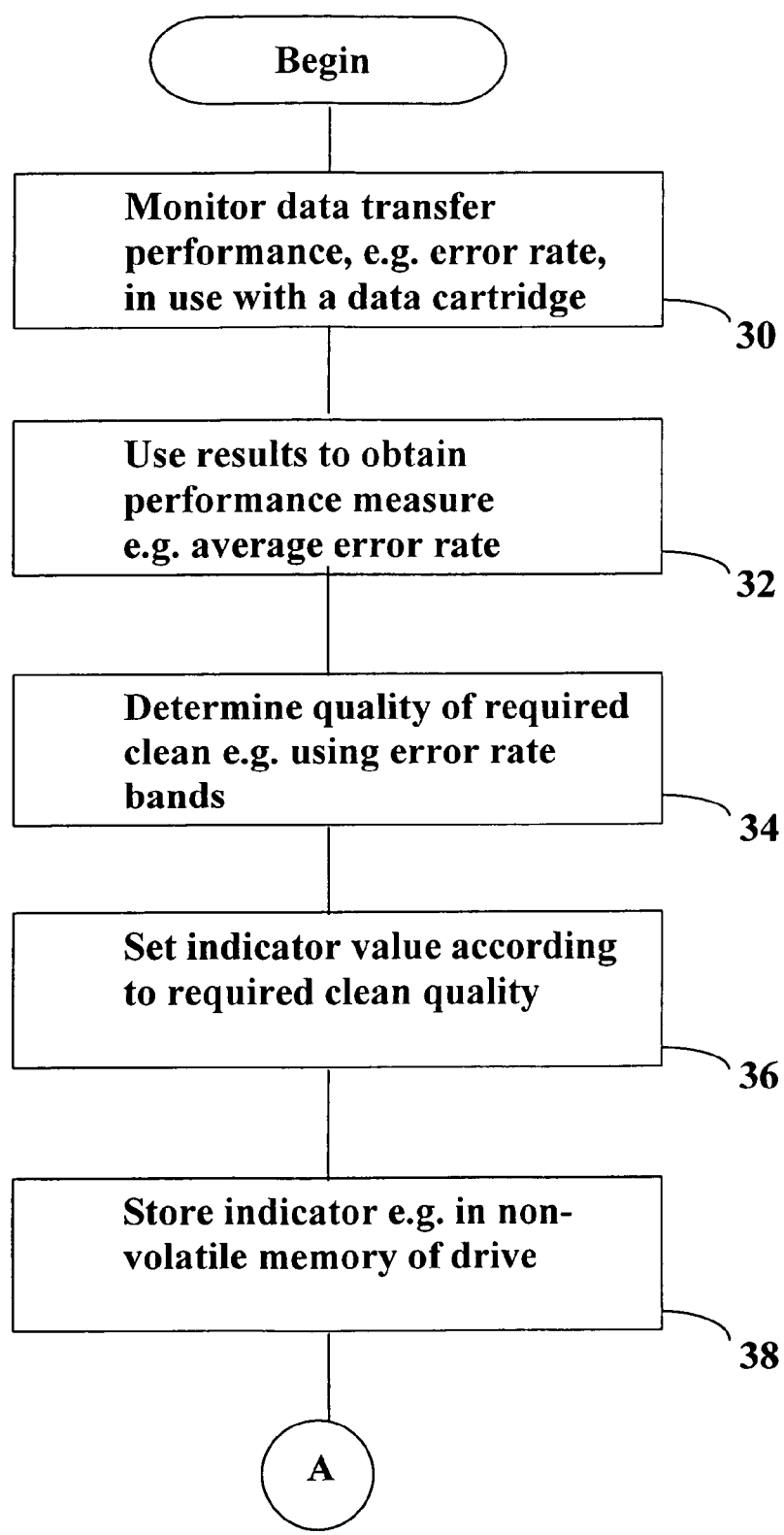
FIG. 5 is a flow diagram illustrating steps used in a method exemplifying the present invention.

Referring to FIG. 5, in use, with a data cartridge 17a received in the drive 14, the drive 14 monitors the error rate (step 30) and uses the results to obtain the average error rate (step 32). The average error rate is used by the drive engine 15 to determine the required quality of clean (step 34), using for example data based on FIG. 4, and the indicator 19 is set to a value that corresponds to the required quality (step 36), that is, to one of the three error rate bands. The indicator 19 value is stored (step 38), as described above, to non-volatile memory of the drive 14.

Figure 6:
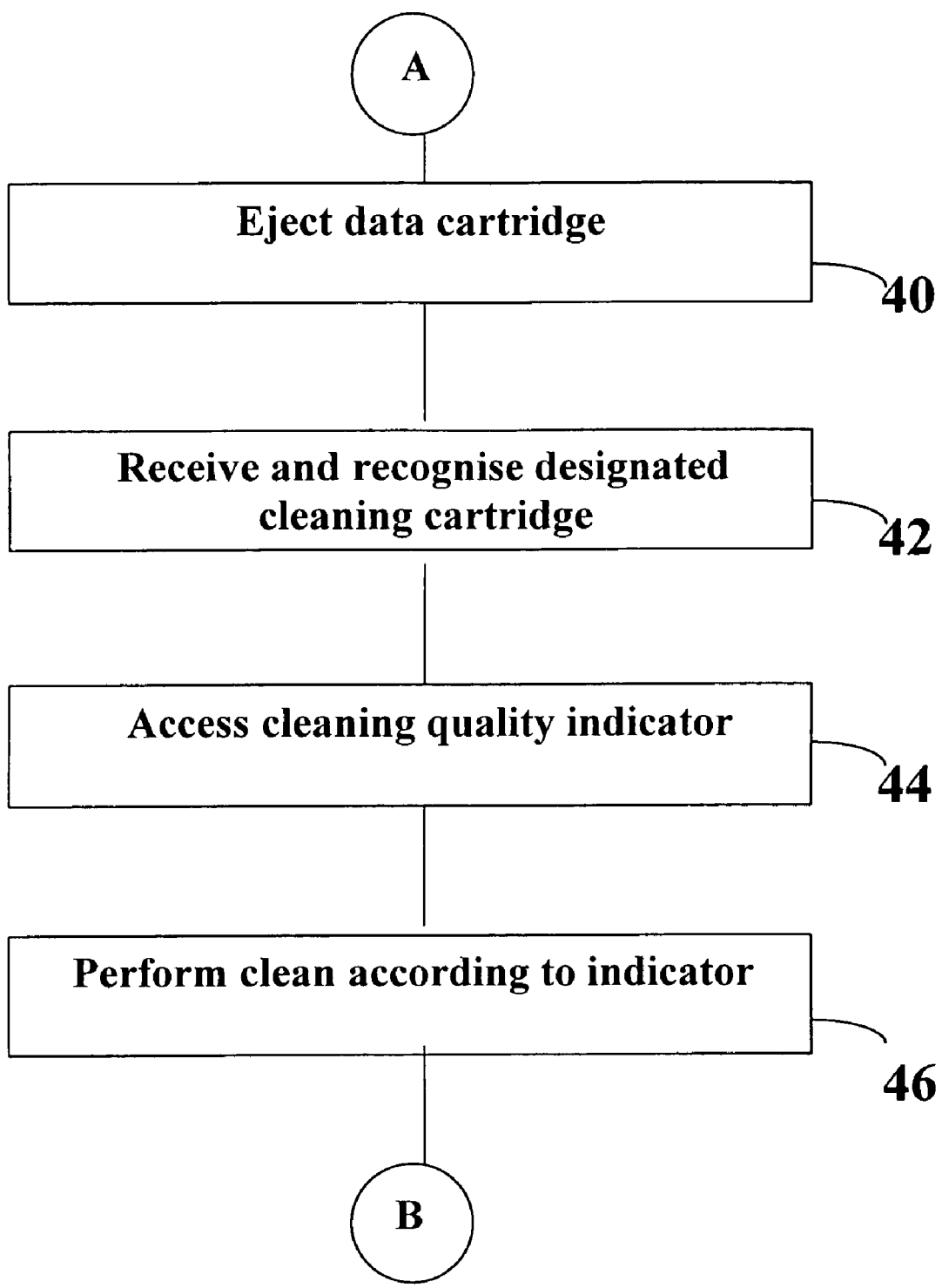
FIG. 6 is a flow diagram illustrating steps used in a further method, that can be performed subsequent to the method of FIG. 5.

Referring to FIG. 6, in use, to perform a cleaning operation, the data cartridge 17a is ejected (step 40), and a designated cleaning cartridge 17b is received into the tape drive 14. The drive 14 recognises that a cleaning cartridge 17b has been received (step 42), for example in a known manner such as by recognition of a pattern of holes in the cartridge's casing, or by communication with solid state memory of the cartridge 17b, if any. In response to receipt of the cleaning cartridge 17b, the drive 14 accesses the stored indicator 19 (step 44). The drive then determines, according to the value of the indicator 19, an appropriate cleaning algorithm 18, and performs the head-cleaning process according to the algorithm (step 46). For example, the algorithms 18 can be recorded in a look up table (not shown) against corresponding indicator 19 values, for determining the appropriate algorithm. The table can be stored, for example, in non-volatile memory of the drive 14 or elsewhere, as convenient.

Also in response to receipt of the cleaning cartridge 17b, the drive 14 stores to the record of cleaning effectiveness 9 the last recorded, pre-clean, average error rate for writing to the immediately previous data cartridge 17a. If, for example, a maximum of ten pairs of (pre- and post-clean) average error rates is already stored in the record of cleaning effectiveness, the earliest stored pair will be overwritten for recording the present pair, using usual first in first out principles.

Figure 7:
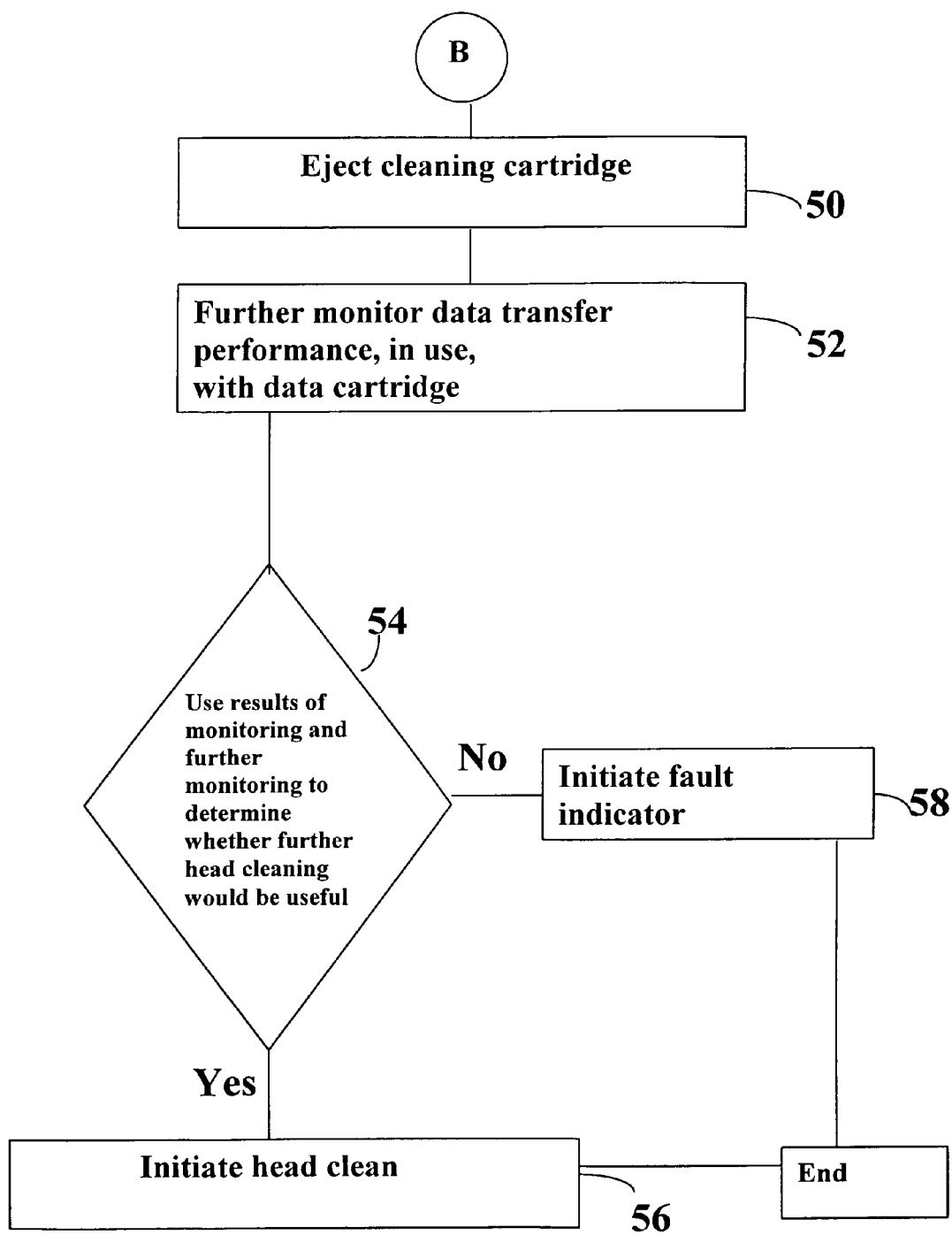
FIG. 7 is a flow diagram illustrating steps used in a further method, that can be performed subsequent to the method of FIG. 6.

Referring to FIG. 7, to continue operational use of the tape drive 14, the cleaning cartridge 17b is ejected (step 50) and a data cartridge 17a is inserted in the drive 14. The error rate is again monitored for write operations to the data cartridge 17a (step 52), and after writing 16 sets the results of the monitoring (that is, the post-clean average error rate) are stored in the record of effectiveness.

A determination is made, whether a further head clean would be likely to be useful to improve the error rate and possibly recover an under performing drive 14 (step 54). In making the determination, whether a further head clean would be likely to be useful, the latest pre- and post-clean average error rates stored in the record of cleaning effectiveness are compared to determine the improvement occasioned by the last clean, and previous pre- and post-clean improvements are also referenced using the record of cleaning effectiveness.

The determinations in the last-mentioned paragraph can be performed, for example using support software 11b running on the host 11. Such software 11b automatically makes the determination whether to initiate a further clean, based on an algorithm that takes into account whether continuous improvements are being occasioned by sequential cleans. Alternatively, the software 11b could display the sequential cleaning effectiveness results to enable a human operator to initiate a further clean if desired. As a further alternative, the determination could be performed by software, firmware or hardware that is located and/or that executes elsewhere, for example in the drive 14, or in a data storage system 10 (for example a tape library) component, or in any other convenient location.

If a determination is reached to proceed, the software 11b automatically controls the tape drive 14 to initiate a further clean (step 56) using the presently stored cleaning indicator 19. If a determination is made that a further clean will not improve the error rate, then a fault indication is initiated (step 58), for example by displaying a fault warning on a display screen of the host 11.

As will be apparent to the ordinarily skilled reader, various appropriate alternative cleaning algorithms can be provided that vary a selection of alternative cleaning parameters. For example, the speed of the tape relative to the head could be varied (perhaps by varying head and/or tape speed), or different tensions could be applied to the tape medium, or any other appropriate parameter could be used. Also, the cleaning indicator 19 could be more sophisticated, so that the indicator value could, for example, encode the value of specific cleaning parameters to be used, selected according to an analysis of the error pattern detected by the monitoring, instead of or in addition to the use of thresholds.

At least some of above-mentioned exemplary embodiments are advantageous in facilitating more thorough, automated, cleaning of drives in the field, but only when appropriate and needed, without unnecessarily extensive and potentially head-wearing cleans. This facilitates a reduction in the number of unnecessary calls for assistance and field returns, which can be a problem because field users often will not follow cleaning advice to the letter before calling, or returning such apparatus for attention by the supplier. Furthermore, the embodiments described do not require use of special cleaning media formulations that allow writing to and reading from the cleaning media. The embodiments also facilitate determination of faults, and potential remedies, in drives with high error rates, by facilitating assessment of cleaning effectiveness by i) software support tools running for example from hosts in the field, and ii) by the drive supplier.

The invention claimed is:

1. A data transfer apparatus, comprising:
   at least one transducer head configured to transfer data between a data transfer apparatus and a data medium;
   a plurality of head-cleaning processes;
   a head-cleaning medium to be used in a selected head-cleaning process; and
   an indicator corresponding to a quality of required cleanliness;
   wherein the data transfer apparatus is configured to:
      monitor at least one data transfer performance characteristic of the transducer head;
      select one of the plurality of head cleaning processes based on the monitored data transfer performance characteristics; and
      clean the transducer head using the selected head-cleaning process.

2. The data transfer apparatus according to claim 1, wherein the plurality of head-cleaning processes corresponding to respective mutually different quality levels of head-cleaning process.

3. The data transfer apparatus according to claim 1, wherein each head-cleaning process comprises at least one cleaning parameter selected from a group of cleaning parameters comprising: a length of head-cleaning medium in passing contact with a head to be cleaned; a head speed; a tension applied to the head-cleaning medium; a number of repetitions of the head-cleaning process; and a duration of at least one portion of the head-cleaning process.

4. The data transfer apparatus according to claim 1, wherein the at least one monitored data transfer performance characteristic comprises a measurement of an average error rate of data transfer.

5. Data transfer apparatus according to claim 1, further comprising a memory, wherein the indicator is stored in a register in the memory.

6. A tape drive for transferring data between at least one read/write head of the tape drive and a magnetic tape data storage cartridge removably received in the tape drive, the tape drive comprising:
   means for monitoring an error rate of the drive for data transfer operations using a standard data storage cartridge;
   means for using results of the monitoring to set an indicator corresponding to one of a plurality of predetermined cleaning algorithms, for subsequent cleaning of the transducer head using a designated cleaning cartridge; and
   means for storing the indicator in memory on the tape drive.

7. A method of cleaning a transducer head of a data transfer apparatus, comprising:
   monitoring at least one data transfer performance characteristic of a transducer head of a data transfer apparatus using a data medium;
   calculating a performance measure based on the monitoring results;
   determining a quality of required cleanliness based upon the calculated performance measure;
   cleaning the transducer head according to the determined quality of required cleanliness.

8. The method of claim 7, wherein after determining a quality of required cleanliness, the method comprises:
   setting an indicator value according to the determined quality of required cleanliness.

9. The method of claim 8, wherein cleaning the transducer head comprises selecting one of a plurality of head-cleaning processes.

10. The method of claim 8, further comprising:
    storing at least one of the monitoring results and the quality of required cleanliness in response to at least one of a data medium unload operation, drive error or periodic update request, in a memory.

11. The method of claim 9, wherein cleaning the transducer head further comprising:
    ejecting the data medium;
    receiving and recognizing a head-cleaning medium; and
    performing the cleaning using the head-cleaning medium.

12. The method of claim 11, whereby subsequent to cleaning the transducer head, the method comprises:
    a subsequent monitoring of the at least one data transfer characteristic with the data medium removably received in the data transfer apparatus;
    determining whether a further head cleaning would likely recover an under-performing data transfer apparatus; and
    performing a further head cleaning using a head-cleaning process selected based upon the subsequent monitoring if it is determined that a further head cleaning process would likely recover an under-performing apparatus.

13. At least one processor configured to clean a transducer head of a data transfer apparatus, comprising:
    a first module for monitoring at least one data transfer performance characteristic of a transducer head of a data transfer apparatus using a data medium;
    a second module for calculating a performance measure based on the monitoring results; and
    a third module for determining a quality of required cleanliness based upon the calculated performance measure;
    a fourth module for cleaning the transducer head according to the determined quality of required cleanliness.

14. A computer program product, comprising:
    a computer-readable medium comprising:
    a first set of codes for causing a computer to monitor at least one data transfer performance characteristic of a transducer head of a data transfer apparatus using a data medium;
    a second set of codes for causing the computer to calculate a performance measure based on the monitoring results;
    a third set of codes for causing the computer to determine a quality of required cleanliness based upon the calculated performance measure; and
    a fourth set of codes for causing the computer to clean the transducer head according to the determined quality of required cleanliness.

* * * * *